United States Patent [19]
Goto

[11] 3,757,211
[45] Sept. 4, 1973

[54] METHOD AND APPARATUS FOR ON-LINE YARN QUALITY CONTROL

[75] Inventor: Tsugio Goto, Nobeoka, Japan

[73] Assignee: Asahi Kasei Kabushiki Kaisha, Kita-ku, Osaka, Japan

[22] Filed: Aug. 30, 1971

[21] Appl. No.: 175,849

[30] Foreign Application Priority Data
Aug. 29, 1970 Japan.............................. 45/75756

[52] U.S. Cl.............................................. 324/61 R
[51] Int. Cl............................................. G01r 27/26
[58] Field of Search ................................. 324/61 R

[56] References Cited
UNITED STATES PATENTS

| | | | |
|---|---|---|---|
| 3,185,924 | 5/1965 | Locher............................... | 324/61 R |
| 2,671,199 | 3/1954 | Truitt................................ | 324/61 R |
| 2,950,436 | 8/1960 | Butticaz et al..................... | 324/61 R |
| 3,039,051 | 6/1962 | Locher............................... | 324/61 R |
| 3,122,956 | 3/1964 | Jucker............................... | 324/61 R X |
| 3,241,061 | 3/1966 | Quittner............................ | 324/61 R |
| 3,303,698 | 2/1967 | Loepfe............................... | 324/61 R X |
| 3,371,568 | 3/1968 | Felix.................................. | 324/61 R X |
| 3,408,560 | 10/1968 | Felix et al........................... | 324/61 R X |

Primary Examiner—Stanley T. Krawczewicz
Attorney—Sughrue, Rothwell, Mion, Zinn & Macpeak

[57] ABSTRACT

A continuously spun monofilament is passed through a detector which is capable of providing a continuous signal representative of the yarn parameters such as variations in denier, formation of fluff, split-offs, additions and the like, which will show and identify various latent color defects which will be manufactured during subsequent dyeing operations. The detector device includes a bridge circuit wherein one chord of the bridge is comprised of a pair of electrodes between which the yarn is adapted to pass whereby any variation in the thickness or mass of the travelling yarn will bring the bridge into an unbalanced station and thereby provide an output signal indicative of the variation in the yarn.

4 Claims, 17 Drawing Figures

METHOD AND APPARATUS FOR ON-LINE YARN QUALITY CONTROL

This invention relates to a process and apparatus for measurement of yarn defects in function of practically variable denier of a yarn, preferably multi-filament yarn.

The main object of the invention is to provide a unique technicque for showing color defects of the yarn in advance of dyeing, and weaving or knitting of the yarn and at the site of manufacture thereof. Additionally, various other yarn defects are also obtained in function of the yarn denier.

The main feature of the process resides in the discriminating specifically appearing color defects information from others by use of a high precision measuring apparatus having an electrical conversion means arranged preferably in a bridge and mounted at the site of manufacture of the yarn. The main principle resides in the observation of the possible color defects signal which can be grouped into two main groups appearing in certain respective different frequencies in terms of the length of the yarn.

This invention relates to a process and apparatus for the measurement of yarn imperfections data, especially adapted for on-line yarn quality inspection purposes.

When man-made yarn quality control is performed through random laboratory analysis, on-line yarn faults can not be detected and thus, a great deal of faulty yarn can be produced until it is decided to be discarded.

Therefore, there is a sincere need for 100 percent-on-line yarn quality control in the field of man-made yarn manufacturing industry.

It is therefore an object of the present invention to provide a process and apparatus for the measurement of several yarn imperfections data on 100 percent-on-line-basis.

Dyed imperfections of man-made yarn depend naturally upon the relative relationship between the coexisting molecular oriented and unoriented structures of the yarn which relationship varies in turn with specific spinning conditions thereof, such as, for instance, composition of the spinning liquor and atmosphere, spinning temperature and velocity, stretching degree of extruded spinning liquor, coagulating conditions of the latter and the like.

According to our experimental results, dyed imperfections of man-made yarn can be divided into two major factors, one being the color tone irregularity and the other being color stripes which will appear when observing a textile fabric woven or knitted from the yarns as wefts upon having been dyed.

It has been a conventional technique for classifying dyed textile fabrics exclusively relying upon the visual observation by a skilled person. As an example, according to a private standard adopted by a Japanese yarn manufacturing company, Asahi Kasei Kogyo Kabushiki Kaisha, of Osaka, Japan, there are six classes in judgement of acceptability and rejectability of dyed fabrics:

Class 0: Substantial color stripes and/or substantial color difference, showing rejectability.
Class 1: Medium color stripes and medium color difference, showing rejectability.
Class 2: Slight color stripes and medium color difference, showing rejectability.
Class 3: Slight color stripes and slight color difference, showing acceptability.
Class 4: No color stripes and slight color difference, showing acceptability.
Class 5: No color stripes and no color difference, showing acceptability.

It should be however noted that as for the defective color difference, there are NBS units (National Bureau of Standards Units) as adopted by American textile manufactures, for the determination of color difference of textile fabric by a reliable scientific way. As for the determination of the degree of color stripes, on the other hand, there is no reliable and acknowledged standard.

It is, therefore, a further object of the invention to provide a process and apparatus for providing effective and reliable anticipating signal showing and identifying the both kinds of color defects latently possessed by a man-made yarn, and indeed, in spite of the spinning or the like processing stage thereof, and in advance of dyeing, weaving or knitting of the yarn.

A still further object is to provide a process and apparatus to detect slubs and splits of a man-made yarn at the site of spinning thereof.

According to our experimental knowledge, the color defects of a man-made yarn regardless of its manufacturing mode, the melt or dry spinning process or the wet spinning process, and of the nature and kind of the yarn, polyester, polyamide or regenerated cellulose origin, will appear substantially periodically for instance, at a frequency of every 3 – 8 meters or 60 – 80 meters when expressed in terms of the length of the yarn, even when it consists of several multifilaments spun concurrently through a multiorifice spinneret. This phenomenon is rather astonishing when considering a multifilament yarn. In order to bring this kind of latent color defects information into visible one, the measurement must be carried out in a substantially precise and accurate way. According to our knowledge, unavoidable noise signals disturbing the defect identification measurement from revealing the aforementioned anticipating color defects becomes rather apparent with lowered frequency of the defects signal. By limiting this frequency when expressed in terms of the length of yarn to about 100 meters, the S/N-ratio can be improved to such degree that the latent color defects signal can be made visible and identified into the aforementioned two specific kinds of color defects to be detected in advance of their practical appearance. In order to realize this, the measuring instrument must be naturally of a high precision type, as will appear more fully as the description proceeds.

Further, according to our experimental knowledge, slubs, splits and the like defects of man-made yarn can be more sharply and precisely detected and identified when obeying the principles of the invention, as will be more fully described hereinafter.

These and further objects, features and advantages of the invention will become more apparent when read the following detailed description of the invention by reference to the accompanying drawings and several preferred numerical examples.

Referring now to the accompanying drawings, a preferred embodiment of an apparatus adapted for carrying out a process according to the invention will be described in detail.

Figure 1:
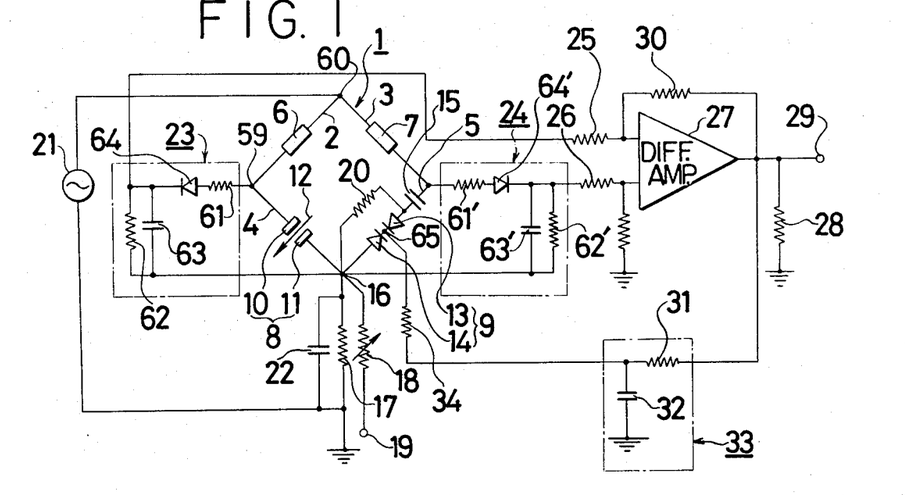
FIG. 1 is a schematic wiring diagram of essential parts of a preferred embodiment of an apparatus adapted for carrying out the process according to the invention.

In FIG. 1 of the accompanying drawings, numeral 1 generally denotes an electrical bridge circuit which comprises four chords or elements 2, 3, 4 and 5 of which the chord elements 2 and 3 comprise impedance elements 6 and 7, respectively. These impedance elements 6 and 7 may be resistors, capacitors or inductors as occasion may desire.

In the present embodiment, the remaining chord elements 4 and 5 include a converter element 8 and a variable impedance element 9, respectively.

In the specific embodiment shown, the converter element 8 is constituted by a condenser which consists of a pair of opposing stationary electrodes 10 and 11, and a yarn 12 is passed through the gap formed between and defined by these electrodes. In the drawings, the measured object or yarn 12 is shown only schematically in a symbolized manner. The variable impedance element 9 is shown, by way of example, in the form of an opposedly positioned and connected pair of variable capacitance diodes 13 and 14. In series with the series-connected diodes 13 and 14, a d.c.-checking condenser 15 is inserted in the chord element 5 of the bridge 1.

Junction point 16 connecting the chord elements 4 and 5 is earthed through a resistor 17, on the one hand, and connected through a variable resistor 18 to a terminal 19 which is connected in turn with a voltage source, not shown. Said resistor 17 serves for providing a d.c. bias to the diodes 13 and 14.

Across the series-connected diodes 13 and 14, a resistor 20 is connected, thereby a certain reverse bias being imposed upon diodes 13 and 14 from source terminal 19.

Junction 60 between chord elements 2 and 3 is connected to the earth through a high frequency oscillator only schematically shown at 21. A by-pass condenser 22 is connected across resistor 17. This oscillator may be a LC-type one, comprising preferably a transistor, not shown, and designed to operate at several to several tens mega cycles. Condenser 22 serves for checking the high frequency voltage from oscillator 21 from mixing with the bias voltage to the diodes 13 and 14.

The impedances of the chord elements 2, 3, 4 and 5 are so selected that when the thickness or mass of the yarn 12 to be measured is substantially constant, the bridge circuit 1 is kept in its balanced condition. When the thickness or mass of the travelling object 12 varies beyond a certain predetermined degree, the bridge 1 will be brought into its unbalanced condition, and the unbalance is detected as will be more fully described hereinbelow. When the yarn 12 is replaced by a different one, the variable resistor 18 is adjusted so as to represent a proper capacitance at the diodes 13 and 14. With a thicker yarn the resistor 18 is adjusted to a correspondingly higher value.

For this detecting purpose, a rectifier circuit 23 as shown by a chain line block and including, by way of example, resistor 61; 62, condenser 63 and diode 64 electrically connected one after another as shown, is connected between junctions 16 and 59 as shown, across the chord element 4, a similar rectifier circuit 24 being connected across the chord element 5. This circuit 24 comprises similar elements 61', 62', 63' and 64' connected one after another in the similar way as before.

Respective rectified outputs from these rectifier circuits 23 and 24 are supplied through respective resistors 25 and 26 to a differential amplifier 27 which is only schematically shown. The amplifier 27 has a load resistor 28 and a terminal 29 therefor, said resistor being grounded as shown. The terminal 29 is used for taking-out of unbalanced output from the bridge 1. There is provided a resistor 30 connected as shown, so as to act as a negative feed-back resistor of amplifier 27. The amplifying gain of the amplifier is determined by the resistance at 30 divided by the sum of resistances at 25 and 62. If necessary, resistors 25 and 26 may be dispensed with.

It will be easily understood by reference to FIG. 1 that part of the output from amplifier 27 is supplied to a delay circuit 33 including resistor 31 and condenser 32 connected with each other as shown, said condenser being earthed. The delayed output from this circuit 33 is conveyed through resistor 34 to junction 65 which is positioned between diodes 13 and 14 adapted to be controlled in such direction or polarity that the unbalance, if any, of the bridge 1 will be cancelled out. More specifically, when an unbalance is detected in the amplifier 30, it is subjected to a delay in the circuit 33 and the thus delayed output is utilized for control of variable impedance element 9. In this way, part of the unbalance output from the circuit 1 will be negatively and delayingly fed back.

In the arrangement so far shown and described, when the yarn 12 to be continuously measured represents practically no unevenness in its thickness or mass, the bridge 1 represents its balanced condition, thus the output therefrom as measured at the terminal 29 being nil. On the contrary, when there is an unevenness in the parameter such as mass of the yarn 12 and said uneven point thereof is situated in the air gap between electrodes 10 and 11 of the converter element 8, the statical capacitance between the electrodes will correspondingly increase or decrease, as the case may be, in comparison with that which will appear in the presence of no unevenness and on account of the difference in permitivity between yarn and air. Therefore, the impedance at converter element 8 will vary with mass variety of the yarn 12, resulting in an unbalanced condition of the bridge 1. The output unbalance will appear at the amplifier 27, showing thus the unbalance.

When the unevenness in yarn 12 extends for a length beyond that which corresponds to the delay period defined by delay circuit 33, an output will be delivered from the latter and the capacitances in diodes 13 and 14 will be controlled so as to bring the bridge 1 back to its balanced condition. Therefore, it will be seen from the foregoing that when yarn thickness unevenness extends for a length beyond that value which corresponds to the said time delay, the unevenness can not be detected. According to our general experience, yarn thickness or mass uneveness is practically unacceptable when the length of the uneven part extends less than 100 meters if observed from the consumer's requirements. Therefore, it is recommendable to set the time delay in the above sense to such value that when yarn unevenness extends over 100 meters or more, it can not be detected.

Now assuming that the resistance at resistor 31 be R megohms, the capacitance of condenser 32 be C microfarads and the travelling speed of yarn 12 under measurement be v meters per second, then the values of C and R may be determined so as to satisfy the following relationship:

$$C \cdot R = K \cdot 100/v$$

wherein $K$ being a constant.

Since the detected unbalance output is negatively fed back to the bridge 1 in the aforementioned manner, only relative variation in thickness or mass of the yarn part directly upon passage thereof through the converter element 8 may be detected in place of the corresponding absolute value.

In the present embodiment, there is provided a means for bringing the yarn 12 into disengagement from its cooperating position with the converter element 8. Such disengaging means is shown by way of example in FIG. 2.

Figures 2, 3:
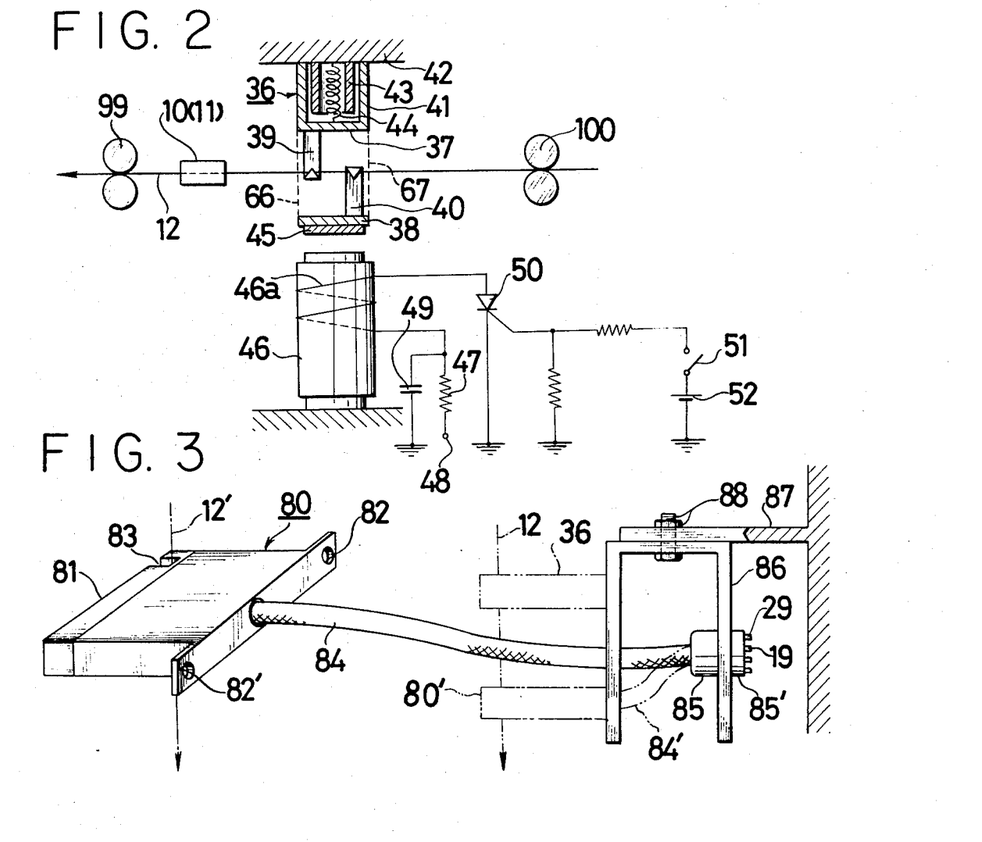
FIG. 2 is a partially sectioned schematic view of an attachment to the apparatus shown in its circuitry in FIG. 1, for measurement of yarn denier.
FIG. 3 is a perspective schematic view of the apparatus shown in FIG. 1.

Next, referring to FIG. 2, a yarn guide means is shown generally at 36 in proximity to said converter element 8. Yarn guide means 36 comprises a separately positioned stationary plates 37 and 38 positioned perpendicularly to the electrode plates 10 and 11 and at the both sides of the travelling yarn 12, preferably at equal distances therefrom. A pair of yarn guide members 39 and 40, preferably made into U-shaped hooks as shown, are provided so as to keep in sliding contact with the travelling yarn 12, said guide members 39 and 40 being positioned in an offset relative position when seen in the yarn travelling direction and substantially in opposition to each other when seen in the lateral direction relative to the said direction. Plates 37 and 38 are rigidly connected with each other by a connecting member, not shown specifically, yet as hinted by a pair of parallel dotted lines 66 and 67 and the plate 37 is made integral with an outer hollow cylinder 41 which is telescopically and slidably mounted on a stationary inner guide cylinder 43 fixed rigidly to a stationary base member 42 only schematically and partially shown. A tension spring 44 is attached by its one end with the base member 42 and by its another end with the plate 37, said spring extending along the common axis, not shown, of the cylinders 41 and 43. Therefore, the assembly comprising the plates 37 ; 38, movable cylinder 41 and yarn guide members 39 and 40 is urged resiliently to move towards the base member 42, yet being positioned in its balanced and effectively working position as shown, for optimumly guiding the travelling yarn 12 in cooperation with yarn guide roller pairs 99 and 100. Plate 38 is attached rigidly with a magnetic member 45, as by glueing or the like conventional fixing means. At a slight distance from the magnetic member 45 and in opposition thereto, there is provided an electromagnet 46 carrying thereon a coil 46a, one end of the latter being electrically connected through a resistor 47 to a source terminal 48 and earthed through a charging condenser 49, as shown. The opposite end of said coil 46a is electrically connected to the anodic electrode of a semiconductor-controlled rectifier element 50, while the cathodic electrode of the latter is earthed and the gate is electrically connected through control switch 51 to source battery 52.

When switch 51 is closed, the element 50 becomes conductive, thereby the electrical charge accumulated in condenser 49 will be discharged and the current will be reduced beyond the conducting current of the element 50 in advance of the recharging of condenser 49 from the battery 48. Therefore, a provisional current passage will be realized through magnet coil 46a and then the current will be automatically interrupted so as to bring the element 50 into its non conducting condition. By current passage through magnet coil 46a, magnetic member 45 is attracted towards the magnet 46 and the yarn 12 is displaced by the movement of the guide members 39 and 40 from its regularly travelling position so that it is positioned from the influence region of the electrodes 10 and 11. In this displaced position of yarn 12, it does not influence upon the impedance of converter element 8.

By the displacement of yarn 12 from electrodes 10 and 11, the impedance of the element 8 will naturally be varied and an unbalance in the bridge 1 will appear as an output at the terminal 29, as was described hereinbefore. The detecting unbalance output will at first rise rather suddenly in the form of an impulse and then gradually decrease on account of the feedback action through the delay circuit. The thus measured peak value of unbalance output appearing upon displacement of the yarn 12 from its regular working or travelling position will correspond to the absolute value of thickness or mass or briefly denier per unit length of the yarn part which has been positioned in the working region of the converter element 8 directly before the yarn displacement. In this way, therefore, the absolute value of local denier of the yarn can be determined.

In the specific mechanism shown in FIG. 2, the magnet 46 is only temporarily energized, and thus, the yarn guide members 39 and 40 will be returned to their regular working position shown for proper guidance of the yarn 12, after termination of the temporal current passage through magnet 46a and under the influence of the spring force at 44. In this way, the once laterally displaced yarn 12 can return automatically to its regularly travelling position between the electrodes 10 and 11. It will normally suffice to manipulate the switch 51 in the above sense for occasional measurement of the localized absolute denier of the yarn. But, under occasion, the measurement can be automatically and periodically performed by automatic on-off control of the switch 51, although not shown.

The continuous measuring method and apparatus so far described by use of the deficiency measuring bridge can provide a high accuracy in the measurement with 1 - 2 percent error only.

Since, according to the invention, yarn denier fluctuation is detected in the form of unbalance output from the bridge circuit 1, disadvantageous influence of variations in the oscillation frequency and output level of the high frequency oscillator 21 and in the d.c.-source voltage can be minimized for maintaining the bridge in its balanced condition. These variations will affect only upon the output level of the unbalanced bridge and therefore the yarn denier fluctuation can be detected without inclusion of appreciable errors. Should even characteristics of each of the constituting elements of the amplifier 27 drift, a substantial compensation therefor can be obtained thanks to the direct and negative feedback operation to the bridge through delay circuit 33.

Under circumstances, junction 16 may be connected directly to the oscillator 21. In this case, a certain level of output, a positive output in the shown specific embodiment, can be obtained from the amplifier 27 in the balanced state of the bridge 1 and this is impressed as bias voltage to the variable capacitance diodes 13 and 14. With such arrangement wherein a certain output can be almost always obtained from the amplifier 27, the bridge 1 may become unbalanced to a large degree in case of thread breakage and thus in absence of the yarn 12 in the air gap formed between the electrodes 10 and 11 and the output from amplifier 27 as arranged in the specific embodiment shown will become a substantial positive value with the danger of saturating the amplifier. In the case of such arrangement, however, when the output from the amplifier 27 becomes higher than a predetermined value, a yarn breakage is assumed to take place and, the yarn 12 is cut off at its supply side so as to avoid entanglingly of yarn on an intermediate yarn guide roller,.

However, in the case of the specific embodiment shown in FIG. 1, a separate bias voltage is supplied through the terminal 19 so that the output from amplifier 27 under the balanced conditions of the bridge circuit 1 may be set to zero, resulting in a greater difficulty of saturation of the amplifier. In this way, a highly reliable and accurate detection of occasional yarn breakage can be realized.

In the aforementioned specific embodiment, condenser is used for converter element 8. But, such an arrangement represents only an advantageous example of the element 8. As a further modified arrangement, the yarn can be guided so as to travel along a passage route positioned between a light source and a phtoelectric cell. Any other arrangement can be utilized so far as the yarn is guided to pass through or in close proximity to the converter element 8 and the passage of a yarn unevenness through or near by the last mentioned element will induce a variation of impedance thereat. The variation impedance element 9 may also be a photoelectric element inserted in a chord of the bridge in such that a light source is provided to cooperate with the element and the irradiation quantity from the light source is controlled in response to the output from the time delay circuit 33. Or alternatively, the output from delay circuit 33 can be utilized to drive an electric motor so as to realize a conversion into a corresponding mechanical movement adapted for impedance control of the variable impedance element inserted in the bridge circuit 1. For use as the of converter element 8 and variable impedance element, any element the resistance value of which is variable, can be used. Therefore, the bridge 1 may be optionally of the a.c. type or of the d.c. type, as occasion may desire.

The circuit shown in FIG. 3 is housed within a detachable hollow casing body 80 shown in FIG. 3. An auxiliary cover 81 is detachably attached to said casing body 80, for instance, in a telescopic manner, although its detailed structure has been omitted from the drawing only for simplicity. A recess 83 is formed on the cover 81 for mounting the condenser electrodes 10 and 11 in the casing walls defining said recess and to provide the air gap formed between and by these electrodes and to allow the yarn 12 on line pass through the gap in the manner as set forth hereinbefore with reference to FIG. 1. From within the interior, a group of outgoing conductors, encased in a flexible sheath 84 extend to a multiple socket connector 85 which is coupled with a plug connector 85' rigidly mounted on a support channel 86 which is bolted at 88 on a rigid support 87 consisting a part of a spinning unit or draw twister, not shown, as the case may be. Casing body 80 is formed at its bottom with bolt opening 82' for detachably attachment to support channel 85. This attached position of said casing body 80 is shown in chain-dotted line 80' and the yarn is shown again with numeral 12. Primed numeral 12' represents the yarn only in an explanatory way for demonstrating the cooperating manner between the yarn and recess 83.

The mechanism shown in FIG. 2 may be combined with that shown in FIG. 3 in such a way that stationary base member 42 is replaced by said support channel 86.

Figure 4:
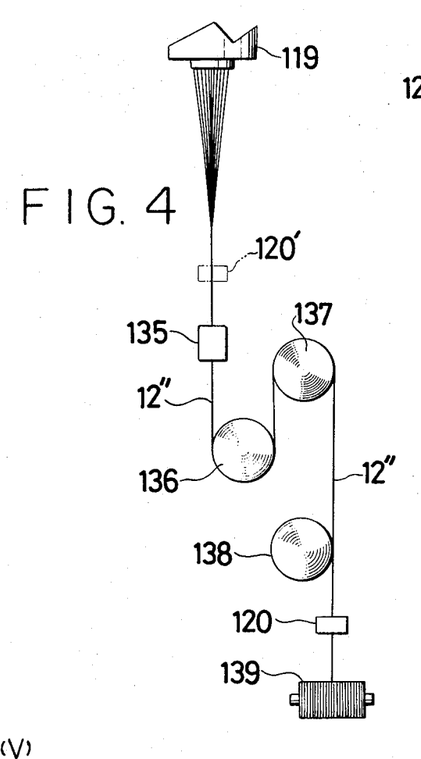
FIGS. 4 and 5 are schematic views for explanation of respective mounting modes of the apparatus according to this invention.

In FIG. 4, a combination, shown only schematically in block at 120, of the apparatuses shown in FIGS. 2 and 3, is arranged to inspect a multifilament 12" as spun and stretched, for performing a 100 percent-on-line service.

Hot spinning material such as a polyolefin polymer is extruded from a spinneret 119 and oiled at 135 by contact with a conventional oiling roller, not specifically shown, upon being cooled and solidified under the influence of cooling air supplied from an air cooler provided with a diffuser, not shown. The solidified multifilament yarn 12" is guided successively through field rollers 136 137 and 138 and wound up on a positively driven winder roll 139, upon passed through the combined unit 120, only schematically shown by a block. The unit 120 may be shifted to a position shown at 12' under occasion.

Figure 5:
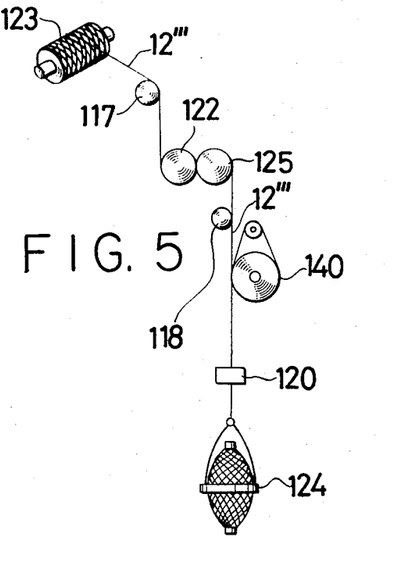

In the arrangement shown in a yarn draft twisting stage in FIG. 5, a yarn 12''' is taken out from a rotatably mounted bobbin 123 and passed successively through several yarn guide means 117, 122, 125, 118 and 140 and into a wound-up parn 124, upon being inspected by and through the combined unit 120, as before, for performing a 100 percent-on-line service.

Figure 6:
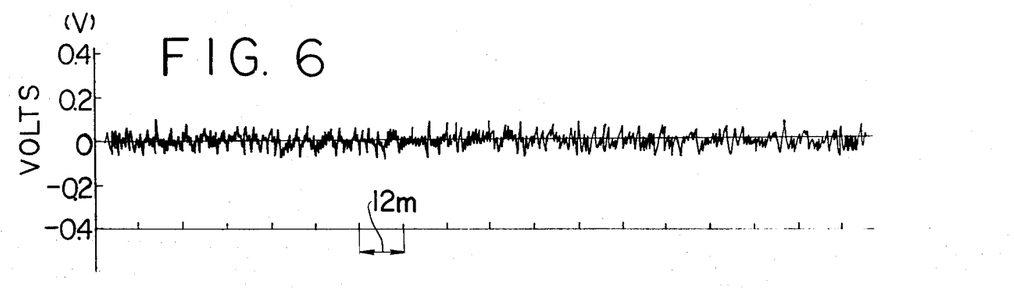
FIGS. 6 – 16 represent several yarn imperfections data curves, several of which are obtained by way of example as outputs from the apparatus shown in FIG. 1, while several others are obtained by processing said output signals in several different modes so as to separate and identify several different types of yarn defects.

In FIG. 6, an output signal taken from output terminal 29 is shown as a practical example. The yarn, 50d/24f (50 denier is composed with 24 filaments) and 30d/12f (30 denier is composed with 12 filaments) tested belongs to Class 4 of the aforementioned Asaki Kasei's Visual Standard which means that the yarn is commercially acceptable.

Figure 7:
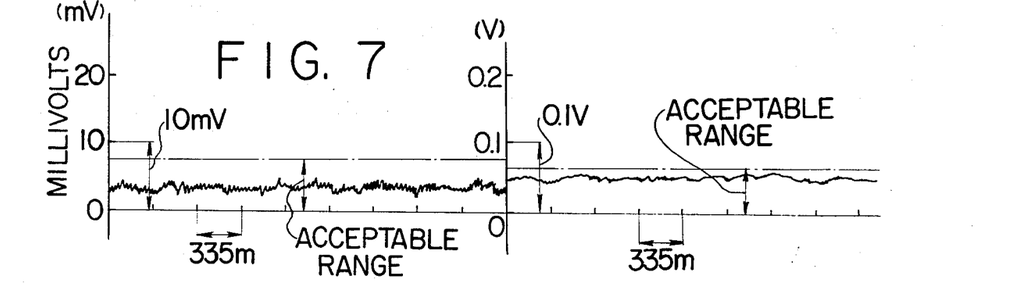

In FIG. 7, left, an integrated result of the output signal shown in FIG. 6. The thus processed voltage varies from about 2 to 5 mv. This result demonstrates that there will be no appreciable color difference in a textile fabric to be manufactured from the yarn.

Figure 9:
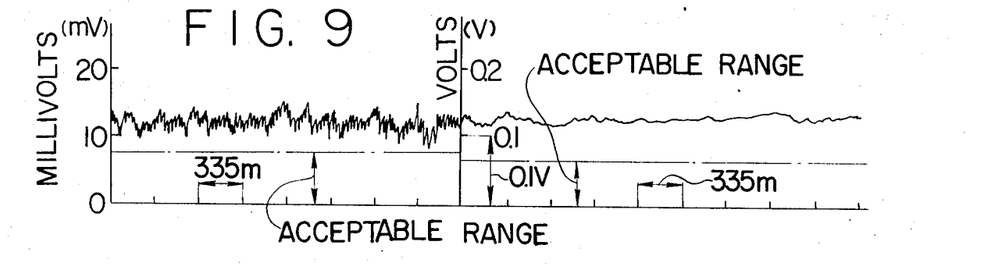

When the signal record is integrated as a further example, the processed signal may show a substantially high value ranging from about 10 to about 15 mv, as shown at left in FIG. 9.

In the following a comparison table will be given for demonstrating the relationship between the NBS-units and the experimental data set forth hereinabove according to the areal or integrating method.

TABLE I

Comparison between NBS-units and the results of the areal or integrating method

| NBS-Units | Areal Processing Methods | Difference in Visual Sense |
|---|---|---|
| 0 – 0.5 | less than 8 × 10 kV. sec. | trace |
| 0.5 – 1.5 | 8 – 12 kV. sec. | slight |
| 1.5 – 3.0 | 12 – 16 kV. sec. | noticiable |
| 3.0 – 6.0 | 16 – 30 kV. sec. | appreciable |
| above 6.0 | above 30 kV. sec. | much |

EXAMPLE

Polyester multifilaments 50d/24 fils and 30d/12 fils were tested, respectively, during their draw twist stage by use of the aforementioned measuring apparatus shown in FIG. 1 wherein the data of the several circuit elements were as follows:

6; 7 ..... 3 killo ohms, carbon film resistors for high frequency use;

20; 34 ... 100 killo ohms, carbon film resistors for high frequency use;

13; 14 ... variable capacity diodes, model 1S2086, manufactured by Nippon Electric Company, Tokyo.

15 .... 30 pF, ceramic condenser;

60 .... 15 killo ohms, carbon film condenser for high frequency use;

30 ..... 2.5 mega ohms, resistor;

28 ... 2 killo ohms, resistor, practically, however, consisting of two series-connected resistors of 200 ohms 1.8 killo ohms;

21 ... 30 mega Herz, output voltage 6V r.m.s., high frequencu oscillator;

61 ... model LM 301 A, IC-type operational amplifier, manufactured by National Semiconductor Corp., California, U.S.A.;

31 ... 1.000 killo ohms, resistor;

32 ... 50 μF, electrolytic condenser;

15 ... condenser (in these experiments, the balance of bridge was adjusted by alternation of capacitance of this condenser, in place of variable resistor);

8 ... condenser, having a dielectric gap of 0.7 mm.

The measuring unit was mounted at a certain upstream position of widing rolls of a draw twister. The yarn (50d/24 fils applicable to the case of FIGS. 6, 8, 10 and 12, or 30d/12 fils applicable to the case of FIG. 12), was passed through the condenser 8 between its electrodes. Elements 17; 25 and 26 had been short-circuited and condenser 22 was dispensed with.

As ascertained with a denier range of multifilament: 30 – 75 deniers, 140 mV were obtained at output terminal 29 (FIG. 1) and corresponding to 1 denier variation, while electrical noises were suppressed to less than 20 – 30 mV which corresponds to less than 0.25 denier of yarn.

Therefore, it will be seen that the necessary measurement accuracy of 1 – 2 percent was fully realized.

In the case of wet spun regenerated cellulose multifilaments, similar results could be obtained, although not shown. For treating dry- or melt spun yarns, the measuring unit can be positioned directly below the spinneret. But, in the case of wet yarns, it is preferable to position the denier variation measuring unit within the yarn winding station, so as to avoid the disadvantageous influence upon the measurement results by the contained aqueous content.

In IFG. 7, right, a result of the same output signal from output terminal 29 upon processed by the peak-to-peak area method. The processed voltage varies from about 0.05 to about 0.06 volt. This means that there will be practically no color stripes on the fabric to be manufactured.

Figure 8:
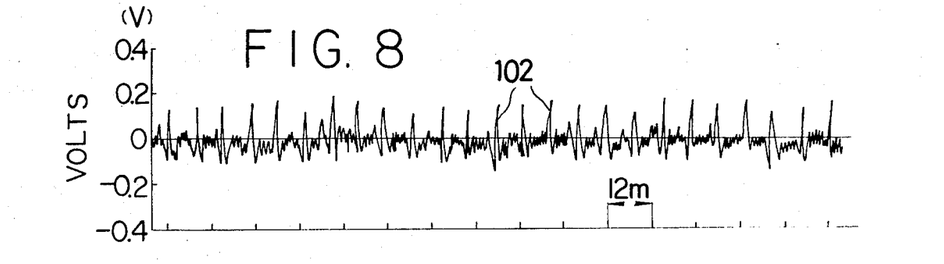

In FIG. 8, a similar output signal from output terminal 29 is shown. A series of substantially periodical pulses 102 are seen which anticipates a later occurence of considerable color stripes. This yarn can be classified as Class 1.5 of the Asahi Standards, yet concerning the color stripes aspect only.

In FIG. 9, left the signal information shown in FIG. 8 has been subjected to the signal integration process as was employed in the case of FIG. 7, left.

At the right half of FIG. 9, a result of measurement of anticipating color difference information is shown when the signal shown in FIG. 8 has been subjected to the peak-to-peak processing mode, as in the case of the right half of FIG. 7. This yarn should be discarded on account of inferior anticipation of the both kinds of possible color defect mode.

Figure 10:
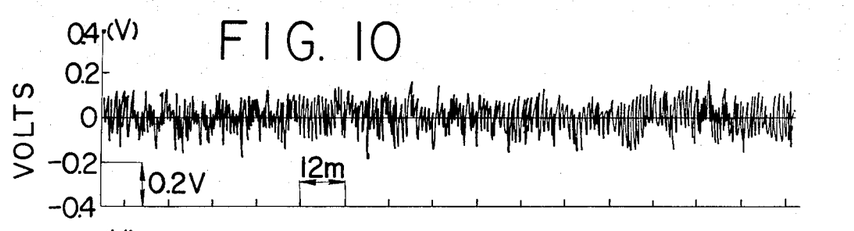
Figure 11:
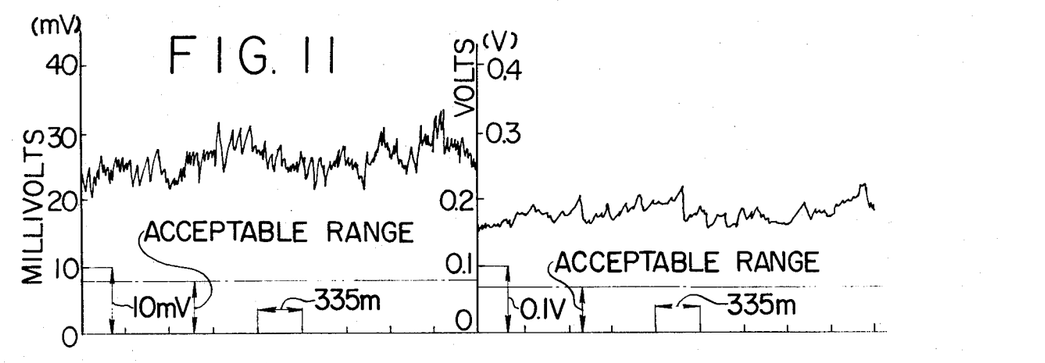

In FIG. 10, a similar experimental result with those of FIGS. 6 and 8 is shown. In this case, however, the color difference defect is rather appreciable in comparison with those of the foregoing. This result corresponds to Color Difference Class 1 and the yarn must therefore be discarded, as most clearly seen from FIG. 11, left half, where the signal information has been subjected to the area-or integrating process as before. At the right half of FIG. 11, a result of the same signal information shown in FIG. 10 when it has been processed by the peak-to-peak process as before.

Figure 12:
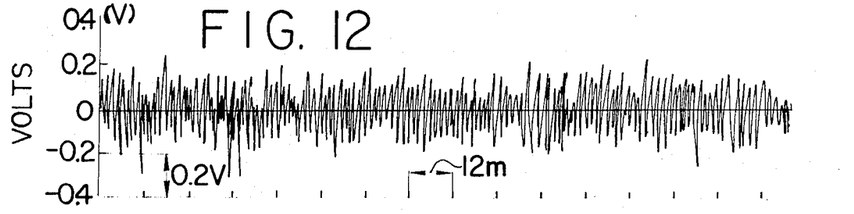
Figure 13:
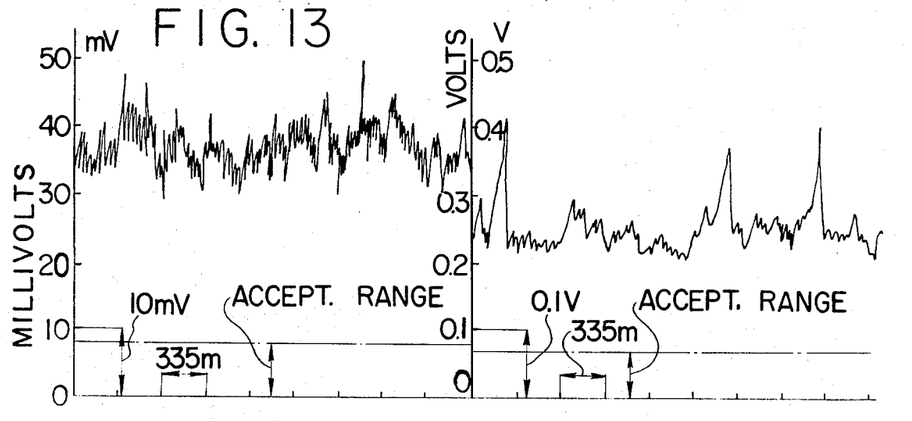

In FIG. 12, a sample of output signal from terminal 29 is shown wherein much rejectable degrees of both anticipating color defect signals are acknowledged. The results correspond to Class 0 of the Asahi Kasei Visual Standards. The signal represents a combination of substantially periodical and peaked pulses representing possible color stripes with rather dense and shorter amplitude signal components responsive to futuer color differences. The integrally processed signal is shown at the left-hand side to FIG. 13, while those of peak-to-peak processed are shown at the right-hand side of the same figure.

Figure 14:
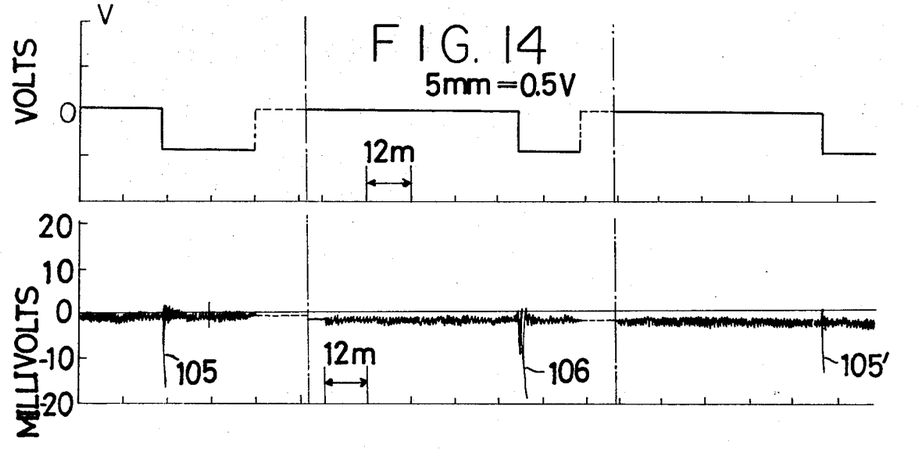

In FIG. 14 at its lower part, a further example of signal output from said terminal 29 is shown only by way of example. In this signal information, there appear two acute pulses 105 and 105' corresponding to generation of fluff having a length of about five times the total denier of the multifilament. The length of the split-out fluff can be measured by observing the length or height of the pulse. These pulses 105 and 105', when occurred will appear naturally at random frequency. In the middle of the lower part of the same figure, there is a rather thick, condensed and complex-shaped pulse 106 which represents a yarn defect consisting of a fluff ball.

The upper half of FIG. 14 represents a signal upon treatment of the signal shown in the lower half of the same figure in a Schmidt trigger combined with a memory for more sharply observing the very existence of these yarn defects.

Figure 15:
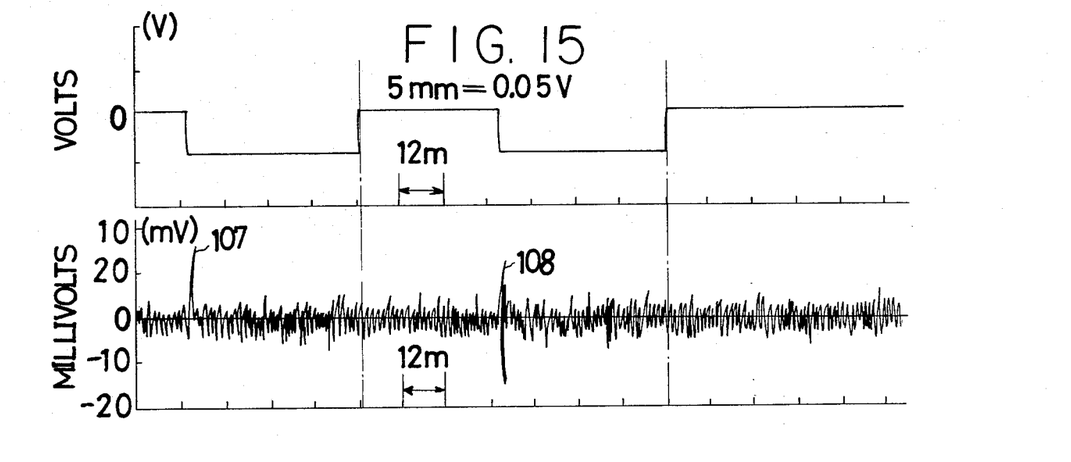

The lower half of FIG. 15 represents still a further example of output signal from terminal 20. There are two acute pulses at 107 and 108. The signal pulse 107 represents loss of a filament from the yarn, extending for about 1 – 2 meters thereof, while pulse 108 represents a successive loss and addition of a filament segment having a length of about 1 – 2 meters to the multifilament. In the upper half of this same figure, similarly processed signal is shown as in the upper half of the foregoing FIG. 14.

Figure 16:
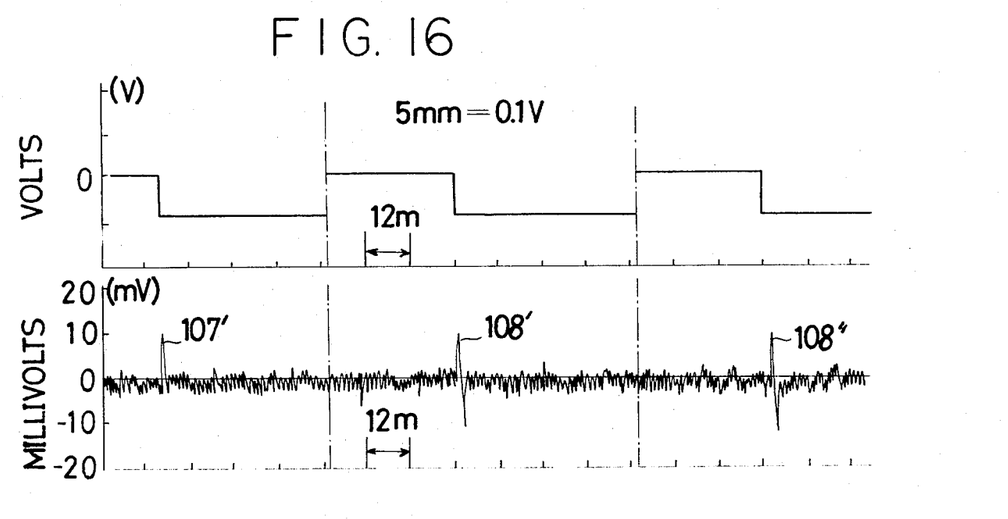

In FIG. 16, lower, a similar output signal delivered from said terminal 29 is shown. The yarn defects shown at 107' and 108' are similar to those shown at 107 and 108 in the foregoing. The upper half of this FIG. 16 may be self-explanatory.

Figure 17:
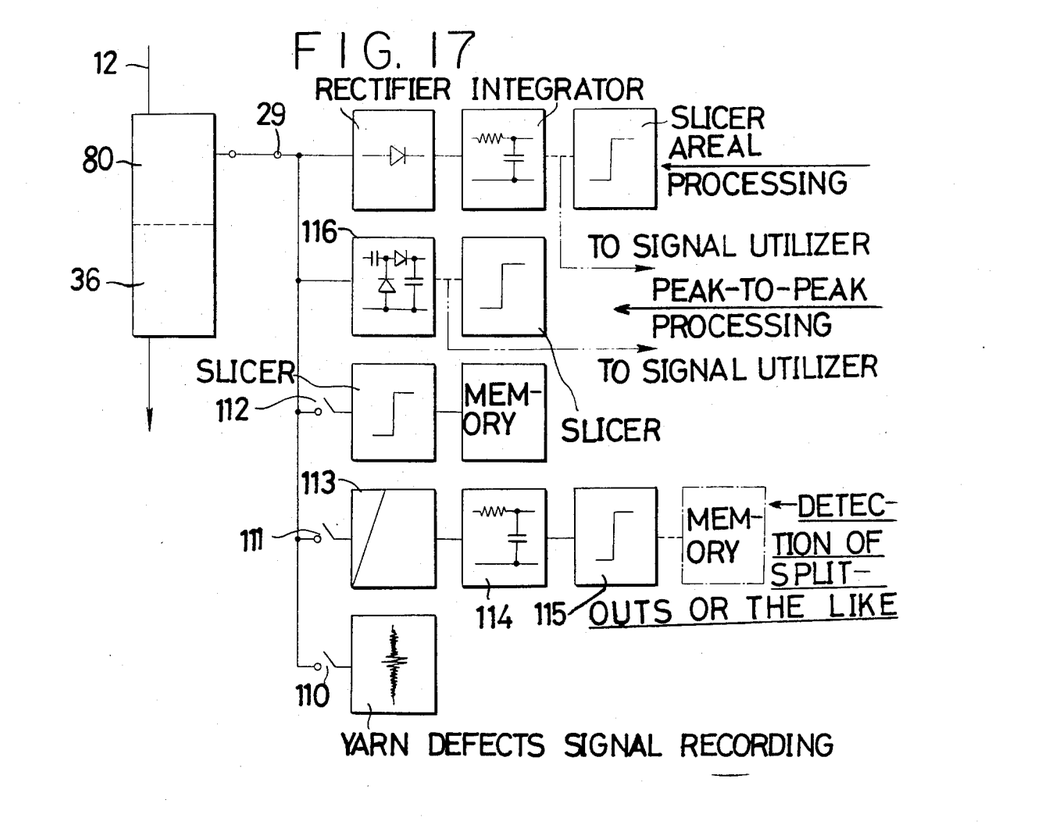
FIG. 17 is a schematic general arrangement for after-treatment of the on-line yarn defects signals measured by means of the apparatus schematically shown in FIGS. 1 and 2.

In FIG. 17, a whole signal processing arrangement is shown.

By closing a switch 110, the output signal delivered from the terminal 29 is conveyed to a signal recorder, not specifically shown, which may be of the conventional rotary drum type cooperating with a solenoid-operated pivotable pen said solenoid being energized with the said output signal. In this case, any one of the recorded information signals shown in the foregoing in FIGS. 6, 8, 10 and 12 may be obtained.

When switch 111 is closed, the output signal from terminal 29 is conveyed successively through a low band path filter 113, an integrator 114 and a slicer or Schmidt trigger 115. In this way, filament split-out or -addition signals as those shown at 107, 107', 108 108' and 108'' in FIGS. 15 and 16 can be clearly detected.

When switch 112 is closed, fluff informations as those shown in FIG. 14 can be obtained.

The upper two lines of FIG. 17 show those circuit constituents for the determination of color difference and color stripes information signals, as was referred to hereinbefore in detail.

In the drawing, 116 denotes a wave peak detector of voltage doubler type.

The embodiments of the invention in which an exclusive property or privilege is claimed are as follows:

1. A process for the measurement of various defects of a man-made yarn, said process comprising in combination the following steps of:
    1. mounting a stationary converter element at the site of manufacture of said yarn;
    2. bringing the yarn being manufactured into mechano-electric cooperation with said converter element, thereby modifying an electrical quantity thereof to deliver continuously a yarn defects information signal having color defect anticipation components expressed as a function of denier variations of said yarn in advance of dyeing the yarn.

2. The process according to claim 1, wherein said color defect anticipation signal components are divided into two types, one representing possible color difference and the other representing possible color stripes.

3. The process according to claim 1, wherein the remainder of the yarn defects signal components deprived of the color defect anticipation components are processed further to isolate them into those of fluff generation, filament split-outs and filament addition.

4. An apparatus for the continuous measurement of various defects of a running yarn filament comprising sensing means disposed in proximity to said running yarn filament, with circuit means including said sensing means as one leg thereof, variable impedance means disposed in another leg of said bridge circuit means, amplifier means providing a signal in response to bridge unbalance and delay means connected between said amplifier means and said variable impedance means for receiving and retarding said signal for a predetermined time prior to feeding said signal back to said variable impedance means to cancel said unbalance signal.

* * * * *